US011113428B1

United States Patent
Totah et al.

(10) Patent No.: US 11,113,428 B1
(45) Date of Patent: Sep. 7, 2021

(54) SHIPPABLE DATA TRANSFER DEVICE WITH ANTI-TAMPER CASING

(71) Applicant: Amazon Technologies, Inc., Seattle, WA (US)

(72) Inventors: John Totah, Half Moon Bay, CA (US); Shan Cheng, Los Altos, CA (US); Frank Charles Paterra, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 624 days.

(21) Appl. No.: 15/933,310

(22) Filed: Mar. 22, 2018

(51) Int. Cl.
*G06F 1/26* (2006.01)
*G06F 21/86* (2013.01)
*G06F 21/88* (2013.01)
*G06F 21/78* (2013.01)
*B32B 33/00* (2006.01)
*B65D 25/14* (2006.01)
*G06F 11/00* (2006.01)
*G06Q 50/28* (2012.01)

(52) U.S. Cl.
CPC .............. *G06F 21/86* (2013.01); *B32B 33/00* (2013.01); *B65D 25/14* (2013.01); *G06F 21/78* (2013.01); *G06F 21/88* (2013.01); *B32B 2571/00* (2013.01); *B65D 2401/00* (2020.05); *G06Q 50/28* (2013.01)

(58) Field of Classification Search
CPC .......... G06F 21/86; G06F 21/78; G06F 21/88; B65D 25/14; B65D 2401/00; B32B 33/00; B32B 2571/00; G06Q 50/28
See application file for complete search history.

(56) References Cited

U.S. PATENT DOCUMENTS

| | | | |
|---|---|---|---|
| 5,605,738 A * | 2/1997 | McGinness | B41M 3/144 250/365 |
| 9,405,333 B1 | 8/2016 | Pine | |
| 10,541,764 B1 * | 1/2020 | Parshin | G06Q 10/087 |
| 10,985,917 B2 * | 4/2021 | Lee | H04L 9/0866 |
| 2005/0139132 A1 * | 6/2005 | Linkskog | E05G 1/14 109/37 |
| 2006/0004675 A1 | 1/2006 | Bennett et al. | |
| 2006/0087883 A1 * | 4/2006 | Ozguz | H01L 23/576 365/185.04 |
| 2007/0124020 A1 | 5/2007 | Staples | |
| 2009/0319078 A1 | 12/2009 | Jackson | |

(Continued)

OTHER PUBLICATIONS

Liza Zyga weblo, "Light-up Cereal Boxes Powered by Shelvers on Display at CES," Jan. 11, 2011, Phys.org 2003-2015, Science X Network, downloaded from http://phys.org/news/201101lightupcerealpoweredshelvesces.html, pp. 1-13.

(Continued)

*Primary Examiner* — Gary S Gracia
(74) *Attorney, Agent, or Firm* — Robert C. Kowert; Kowert, Hood, Munyon, Rankin & Goetzel, P.C.

(57) ABSTRACT

A shippable data transfer device includes a data storage medium encased in a chamber surrounded by an anti-tamper casing. The anti-tamper casing includes an anti-tamper layer with identifying elements arranged in a unique or otherwise identifiable pattern. The anti-tamper layer is configured to actively re-arrange, alter, or obscure the identifying elements in response to a breach of the anti-tamper casing.

20 Claims, 8 Drawing Sheets

(56) References Cited

U.S. PATENT DOCUMENTS

| | | | |
|---|---|---|---|
| 2009/0322510 A1* | 12/2009 | Berger | G06Q 10/0833 |
| | | | 340/539.1 |
| 2010/0138764 A1 | 6/2010 | Hatambeiki et al. | |
| 2010/0168903 A1* | 7/2010 | Aas | G07D 11/125 |
| | | | 700/214 |
| 2010/0177487 A1* | 7/2010 | Arshad | G06F 21/86 |
| | | | 361/737 |
| 2010/0205906 A1* | 8/2010 | Agarwal | B65D 85/62 |
| | | | 53/399 |
| 2012/0205801 A1* | 8/2012 | Bindrup | H01L 24/17 |
| | | | 257/738 |
| 2012/0280043 A1* | 11/2012 | Roseman | G06K 19/14 |
| | | | 235/488 |
| 2013/0187756 A1* | 7/2013 | Fisher | G07C 9/00896 |
| | | | 340/5.61 |
| 2013/0326583 A1 | 12/2013 | Freihold et al. | |
| 2014/0201094 A1* | 7/2014 | Herrington | G06Q 30/018 |
| | | | 705/317 |
| 2014/0314339 A1* | 10/2014 | Docherty | B32B 9/00 |
| | | | 383/5 |
| 2015/0096266 A1* | 4/2015 | Divine | A61J 1/03 |
| | | | 53/452 |
| 2015/0191960 A1* | 7/2015 | Robson | E05G 1/14 |
| | | | 109/25 |
| 2015/0324745 A1 | 11/2015 | Goodall et al. | |
| 2016/0068323 A1* | 3/2016 | Suryanarayanan | B65D 75/5838 |
| | | | 206/459.5 |
| 2016/0155679 A1* | 6/2016 | Davies | H01L 23/576 |
| | | | 257/693 |
| 2016/0328535 A1* | 11/2016 | Barr | A61J 7/0472 |
| 2017/0124919 A1* | 5/2017 | Karan | G06K 19/07722 |
| 2017/0316228 A1* | 11/2017 | Campbell | G06F 21/86 |
| 2017/0316294 A1* | 11/2017 | Merkle | G06K 19/06009 |
| 2018/0365818 A1* | 12/2018 | Wei | G06T 7/60 |
| 2020/0265282 A1* | 8/2020 | Bergmuller | G07D 7/003 |

OTHER PUBLICATIONS

International Search Report and Written Opinion from PCT/US2016/040510, dated Aug. 25, 2016, Amazon Technologies, Inc., pp. 1-17.

Jeff Barr, "AWS Import/Export: Ship US That Disk! AWS Blog", Published May 21, 2009, Retrieved from URL: https://aws.amazon.com/blogs/aws/send-us-that-data/, pp. 1-6.

Anonymous, "Batch Cloud Data Transfer Services—Amazon Import/Export Snowball Applicance", Jun. 17, 2016, Retrieved from URL: https://web.archive.org/web/20160617044144/http://aws.amazon.com/importexport/, pp. 1-6.

U.S. Appl. No. 14/788,671, filed Jun. 30, 2015, Colin Laird Lazier et al.

U.S. Appl. No. 15/257,788, filed Sep. 6, 2016, Frank Charles Paterra.

* cited by examiner

SHIPPABLE DATA TRANSFER DEVICE WITH ANTI-TAMPER CASING

BACKGROUND

Growth of data storage capacity and big data has far outpaced the rate of increase of data transmission bandwidth capable of transferring collections of big data. For example, transmitting big data from one storage facility to another storage facility can be prohibitively costly (e.g., requiring costly system upgrades) or lengthy transfer times (e.g., network transmission taking months to years). Physically moving the storage media may introduce security risks or may not be an available option. Some solutions have involved transferring the data to a portable storage device and shipping the portable storage device to another storage facility where the data is transferred to another storage system.

However, when it comes to shipping a portable storage device, once the storage device leaves the control of a service provider, the portable storage device may be susceptible to tampering. For example, the portable storage device may be intercepted in transit or may be tampered with by an adversary acting as a legitimate customer when receiving the portable storage device to subsequently attack the next recipients.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments describe systems and processes associated with a shippable data transfer device that includes an anti-tamper casing.

In some embodiments, a self-contained shippable data transfer device that includes an anti-tamper casing may include an enclosure suitable for shipping a solid-state electrical device so that no additional packaging is necessary. Also the enclosure may include an outer casing that includes a durable outer layer that protects the device during shipping, an inner shock-absorbent layer that protects a solid-state electrical device contained in the device from shocks experienced during shipping, and an anti-tamper layer positioned between the outer durable layer and the inner shock-absorbent layer. The anti-tamper layer may be configured to react to indicate tamper evidence for a breach of the casing that penetrates the outer durable layer. For example, in some embodiments, the anti-tamper layer may include identifying elements arranged in a matrix and one or more encapsulated substances included in the matrix. The identifying elements may include particles that are visible from outside of the enclosure. In some embodiments, the identifying elements may include particles with magnetic or radioactive properties. In some embodiments, the identifying elements may be visible in visible light or visible in ultraviolet light. In some embodiments, the identifying elements may include taggants with uniquely identifiable chemical structures. The identifying elements may be arranged in the matrix in a random, unique, or otherwise identifiable pattern. In some embodiments, the encapsulated substances included in the matrix may react to cause the identifying elements to be re-arranged if a pocket in the matrix enclosing the encapsulated substance is breached or may otherwise cause the identifying elements to be obscured.

For example, in some embodiments, the encapsulated substances may include a first chemical and a second chemical in separate capsules. The first and second chemical may be non-reactive when separate, but may react to form a third chemical if combined, for example in response to one or more pockets containing the first or second chemical being breached. The third chemical may react with the matrix and cause the matrix to dissolve, or otherwise change. Thus, the identifying elements included in the matrix may be irreversibly re-arranged in reaction to one or more of the pockets comprising encapsulated substance(s) being breached. In some embodiments, a breach of a first set of one or more pockets comprising encapsulated substances may set in motion a chain reaction, wherein a third chemical formed due to a reaction of the first and second chemicals of the breached pockets causes other pockets to be breached and further causes the first and second chemicals included in the other pockets to mix and react to form more of the third chemical that then causes even more pockets to be breached. Resultantly, identifying elements included in the matrix may be re-arranged or obscured as the third chemical dissolves or otherwise alters the matrix.

In some embodiments, a shippable data transfer device that includes an anti-tamper casing may include an anti-tamper layer that includes chemicals that cause a chain reaction in response to tampering regardless of a surrounding environment. For example, the anti-tamper layer may react to a breach regardless of an oxygen concentration, nitrogen concentration, temperature, pressure, or other environmental characteristic of a surrounding environment. In some embodiments, additional sensors for the environmental characteristics of a surrounding environment may also actively respond to a tampering attempt that results in an electronic event for high-confidence fail-safe tamper response. For example, the anti-tamper layer may also include a tamper-respondent electronic mesh that results in an electronic event for high-confidence fail-safe tamper response. In some embodiments, an electronics chamber of a shippable data transfer device that includes an anti-tamper casing may be hermetically sealed, so that the electronics are not affected by chemicals in the surrounding environment.

In some embodiments, an anti-tamper layer of a shippable data transfer device that includes an anti-tamper casing may have a "frangible" property, wherein once the anti-tamper layer is breached the anti-tamper layer falls apart, for example in response to the reaction of a first and second chemical to form a third chemical that dissolves a matrix of the anti-tamper layer, such as a polymer matrix that includes the identifying elements and the pockets of encapsulated chemicals.

In some embodiments, an anti-tamper casing may include anti-tamper features using multiple tamper indicating layers to passively show tamper evidence via frangibility properties of the multiple tamper indicating layers. In some embodiments, an anti-tamper casing may also include a hidden trap layered mesh as a covert active seal with an electronic function for tamper response with a high-confidence fail-safe electrical event when tampering is detected. In some embodiments, an anti-tamper casing may also include additional intrusion detectors that are active electronic sensors that create high-confidence fail-safe electrical events when environmental conditions reach threshold limits.

In some embodiments, an outer durable layer of a shippable data transfer device that includes an anti-tamper casing, may be transparent or see-through. For example the outer durable layer may be made of a clear hardened acrylic. In some embodiments, one or more images from one or more points of view may be captured of a shippable data transfer device that includes an anti-tamper casing before the data transfer device leaves the control of a service provider. For example, in some embodiments, images from points of view that show all six sides of a solid-state electronics chamber of the shippable data transfer device may be captured. The image(s) may record a unique arrangement of the identifying elements included in the matrix of the anti-tamper layer. In some embodiments, the recorded image of the unique arrangement of the identifying elements may be compared to subsequently captured images of the identifying elements. Matching images or images indicating matching arrangements of the identifying elements may indicate that the data transfer device has not been tampered with. Also, non-matching images or images indicating a different arrangement of identifying elements may indicate that the data transfer device has been tampered with or is a counterfeit device.

In some embodiments, identifying elements may include magnetic elements, radioactive elements, reflective elements, colored particles, colored patches, or other elements that may be arranged in a unique way to form a "signature" of the shippable data transfer device that includes an anti-tamper casing. In some embodiments, an "image" as referred to herein may include any type of image that records an arrangement of the identifying elements and may not be limited to photographic images. For example, an image may include an image captured using ultraviolet light, an image capturing magnetic fields, or radioactive fields, etc.

In some embodiments, a shippable data transfer device that includes an anti-tamper casing may include a seamless casing, wherein the casing is fabricated around the solid-state electrical components of the shippable data transfer device with the solid-state electrical components inside the enclosure as the casing is fabricated. Thus, in some embodiments, the only way to access the solid-state electrical components may be to destroy or otherwise breach the casing (because there are no seams that allow access to the solid-state electrical components within the casing).

In some embodiments a shippable data transfer device that includes an anti-tamper casing may be used for moving large amounts of data from one data storage facility to another data storage facility. For example, the shippable data transfer device may be used for moving data from one storage facility to another storage facility when data transmission networks cannot move the data fast enough. A shippable data transfer device may also be used for moving data from one storage facility to another facility when a secure means of transfer is required.

In some embodiments, a shippable data transfer device that includes an anti-tamper casing may be equipped with an electronic display as part of or incorporated into an exterior of the device. In some embodiments, the display may be a low-power display such as an electronic ink display and the display may be updated with any of various information, including a destination addresses of where the device is being shipped. In some embodiments, a shippable data transfer device that includes an anti-tamper casing may be equipped with various sensors, such as a GPS sensor for tracking shipping progress of the device or environmental sensors such as accelerometers, temperature sensors, humidity sensors, pressure sensors, or the like. The device may be ruggedized such that the device is less likely to be damaged during transit, in some embodiments.

Various processes may be instituted by a service provider or customer that uses a shippable data transfer device that includes an anti-tamper casing, such as processes to keep the data secure. For instance, a service provider, such as a storage service provider with a number of data transfer devices, may implement a provisioning process that ties a particular data transfer device to a particular request for data transfer services. The service provider may install security information on the data transfer device and direct the display of the data transfer device to display a shipping destination associated with the request and provide the data transfer device to a carrier as a self-contained shipping container, in some embodiments. In some embodiments, before the data transfer device leaves the control of the service provider, the service provider may capture one or more images of a unique "signature" of the data transfer device, wherein the image of the "signature" comprises one or more patterns of identifying elements included in the matrix of the anti-tamper layer of the anti-tamper casing of the shippable data transfer device.

In some embodiments, a customer receiving the shippable data transfer device that includes an anti-tamper casing may capture images of the device from similar points of view. In some embodiments, the customer may submit the captured images to the service provider for verification of the integrity, identity and/or authenticity of the shippable data transfer device. The service provider may compare the images captured by the customer to the images captured before the shippable data transfer device left the control of the service provider. If the "signature" pattern of the identifying elements of the anti-tamper layer shown in the images captured by the customer substantially match the images captured by the service provider prior to relinquishing control of the data transfer device, the service provider may confirm the integrity, identity and/or authenticity of the data transfer device to the customer. However, if the "signatures" of the identifying elements of the anti-tamper layer do not match, the service provider may alert the customer to a potentially tampered with data transfer device and may further instruct the customer to return the shippable data transfer device or quarantine the shippable data transfer device for security controlled chain of custody forensic procedures.

In some embodiments in which the shippable data transfer device also includes an electronic display shipping label, the destination information for the device may be updated after being received by the customer. For example, updated address information may be obtained over the customer network or from memory of the data transfer device and displayed on the electronic display. In some embodiments, the data transfer device may realize (e.g., based on a GPS sensor) that it is located at the customer location and change the displayed address information from the customer site to the next destination. The customer may then provide the shippable data transfer device to a carrier as a self-contained shipping container for shipment without any other additional packaging or labeling.

In another process, when the shippable data transfer device that includes anti-tamper casing is received back at the service provider (for example in accordance with an address or a code indicating an address displayed by the display) an ingestion process may be performed. For example, the service provider may capture images of the "signature" of the identifying elements included in the anti-tamper layer of the data transfer device and compare the images to images captured of the "signature" of the identifying elements of the anti-tamper layer prior to relinquishing control of the data transfer device. If the "signatures" in the compared images substantially match, the service provider may conclude that the data transfer device has not been tampered with from the time it previously left the physical control of the service provider. In response to such a determination, the service provider may further process the received data transfer device. For instance, the data transfer device may be connected to a service provider network, the data on the device decrypted and stored to a storage service of the service provider, and the data transfer device prepared for re-use. If the "signatures" do not match, the data transfer may be diverted from being connected to the service provider network and further evaluated using a security controlled forensic procedure.

Figure 1A:
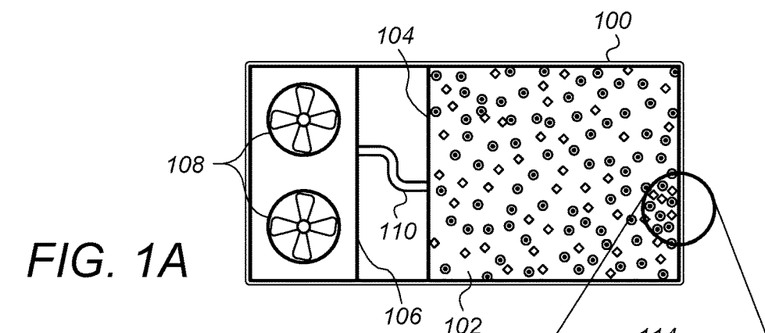
FIG. 1A illustrates a data transfer device comprising an anti-tamper casing, according to some embodiments.

FIG. 1A illustrates a data transfer device comprising an anti-tamper casing, according to some embodiments.

Portable data transfer device 100 includes anti-tamper casing 102. Also, in some embodiments, a shippable data transfer device that includes an anti-tamper casing, such as data transfer device 100, may include separate chambers wherein a persistent storage medium is enclosed in a chamber surrounded by an anti-tamper casing, such as anti-tamper casing 102, and another chamber includes auxiliary components of the shippable data transfer device. The auxiliary components included in the other chamber may be components that need to be accessed more frequently, such as cooling components, power storage components, network interface components, user interface components, disk devices storing encrypted data, etc.

For example, data transfer device 100 includes chamber 104 surrounded by anti-tamper casing 102 that encloses persistent solid-state electrical mediums, such as solid-state memory devices or other types of non-volatile memory devices. Data transfer device 100 also includes chamber 106 that includes cooling systems 108 and may further include power storage devices (not shown), network interface connectors (not shown) and other auxiliary equipment that supports the persistent solid-state electronics devices enclosed in chamber 104. In some embodiments, a solid-state electronics chamber and an auxiliary chamber of a shippable data transfer device may be connected by a hardened conduit, such as conduit 110. In some embodiments, a hardened conduit, such as conduit 110, may include heat pipes that thermally connect the solid-state electronic devices of the solid-state electronics chamber, such as chamber 104, with the cooling systems of the auxiliary chamber, such as cooling system 108 of chamber 106. Additionally, in some embodiments, a hardened conduit between chambers, such as conduit 110, may include one or more wires, for example to supply power to the solid-state electronic devices of the storage chamber and/or to connect the solid-state electronic devices of the storage chamber to one or more network interfaces of the auxiliary chamber. As shown in FIG. 1A, a hardened conduit between chambers of a shippable data transfer device with an anti-tamper casing may include one or more lateral shifts through the frangible anti-tamper layer, such that there is not a straight path via the hardened conduit from the auxiliary chamber, such as chamber 106, to the solid-state electronics chamber, such as chamber 104. For example, the hardened conduit and the heat pipe(s) included therein may form a labyrinth or other non-straight path such that a compromised heat pipe does not provide a direct path circumventing the frangible anti-tamper layer into the solid-state electronics chamber, such as chamber 104. In some embodiments, electronic devices such as storage devices included in chamber 104 may be isolated with a gap separating both chambers to allow observation of all six sides of the solid-state electronics chamber from cooling systems and power supplies, such as may be included in chamber 106, other than a hardened conduit, such as conduit 110.

Figure 1B:
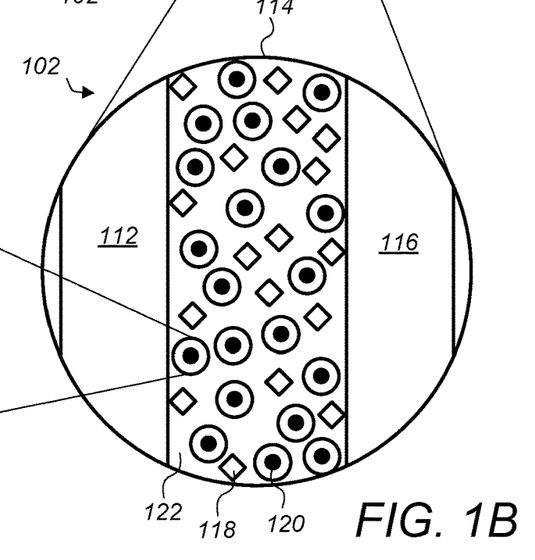
FIG. 1B illustrates a cut-away view of an anti-tamper casing of a data transfer device, according to some embodiments.

FIG. 1B illustrates a cut-away view of an anti-tamper casing of a data transfer device, according to some embodiments.

Casing 102 includes inner shock absorbent layer 112, anti-tamper layer 114 and outer durable layer 116. In some embodiments, inner shock absorbent layer 112 may include a honeycomb design or other type of design configured to absorb shocks and/or to provide low-weight structural integrity. In some embodiments, a honeycomb or other shock-absorbent structure of inner shock absorbent layer 112 may be made of Kevlar, carbon fiber, or other suitable materials. In some embodiments, a durable outer layer, such as durable outer layer 116, may be made out of a ruggedized material and may be transparent or otherwise see-through. In some embodiments, a durable outer layer, such as durable outer layer 116, may not be transparent in visible light, but may nevertheless allow images to be captured (from all six sides) of identifying elements included in an anti-tamper layer, such as anti-tamper layer 114, from the exterior of the data transfer device 100. For example, radiation, magnetic fields, taggants, etc. may be detectable to be included in an image captured from the exterior of data transfer device 100 through outer durable layer 116. In some embodiments, outer durable layer 116 may be made of a hardened acrylic material or other suitable ruggedized material.

In some embodiments, an anti-tamper layer, such as anti-tamper layer 114, may include identifying elements and pockets of chemical solution(s) embedded in a matrix structure, such as a polymer matrix. For example, anti-tamper layer 116 includes identifying elements 118 and chemical pockets 120 embedded in polymer matrix 122. In some embodiments, the identifying elements 122 may be organized in a random, unique, or otherwise identifiable pattern.

Figure 1C:
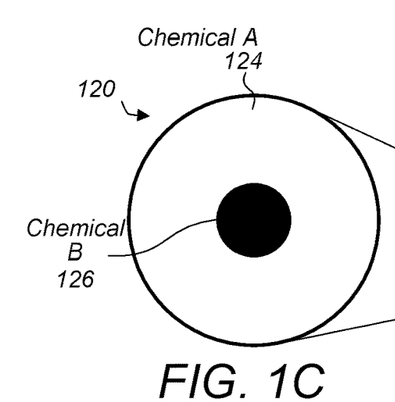
FIG. 1C illustrates a close-up view of a pocket comprising two chemicals of an anti-tamper layer, according to some embodiments.

FIG. 1C illustrates a close-up view of a pocket comprising two chemicals of an anti-tamper layer, according to some embodiments.

Figure 4A:
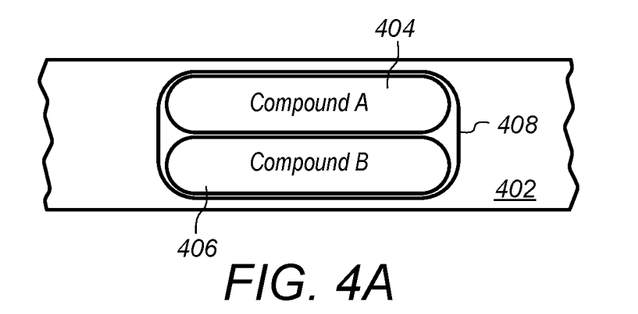
FIGS. 4A-4D illustrate a pocket of an anti-tamper layer being breached and reacting to the breach, according to some embodiments.

As shown in FIG. 1C, in some embodiments, a chemical pocket, such as chemical pocket 120 may include two different chemicals one encapsulated in a capsule of another. Or, as shown in FIGS. 4A-4D may include two different chemicals in adjacent capsules. Also, in some embodiments, as shown in FIGS. 5A-5B, a chemical pocket may include a single encapsulated chemical or substance. In FIG. 1C, chemical pocket 120 includes chemical A 124 and chemical B 126. In some embodiments, chemical B is encapsulated in a capsule within another capsule that encapsulates chemical A. For example, a gelatin, membrane, or other substance may separate chemical A 124 and chemical B 126 under normal conditions. However, as described below in regard to FIG. 1D, in reaction to a breach, the substance separating chemical A 124 and chemical B 126 may be compromised and may further allow chemicals A and B to mix to form a reactive chemical C that reacts with polymer matrix 122 or otherwise alters identifying elements 118 included in polymer matrix 122.

In some embodiments, chemical A may be a polyol and chemical B may be an isocyanate or polyacid that reacts with a polyol when combined. In some embodiments, chemical A may be sodium acetate and chemical B may be water, wherein the sodium acetate and the water have an exothermal reaction when combined, wherein the heat generated from the reaction melts or dissolves the polymer matrix of the anti-tamper layer. Thus causing the identifying elements in the polymer matrix to be re-arranged. In some embodiments, chemical A may be an isocyanate and chemical B may be water wherein the isocyanate and water react to form a foam when combined, wherein the foam obscures or re-arranges the identifying elements in the polymer matrix.

Figure 1D:
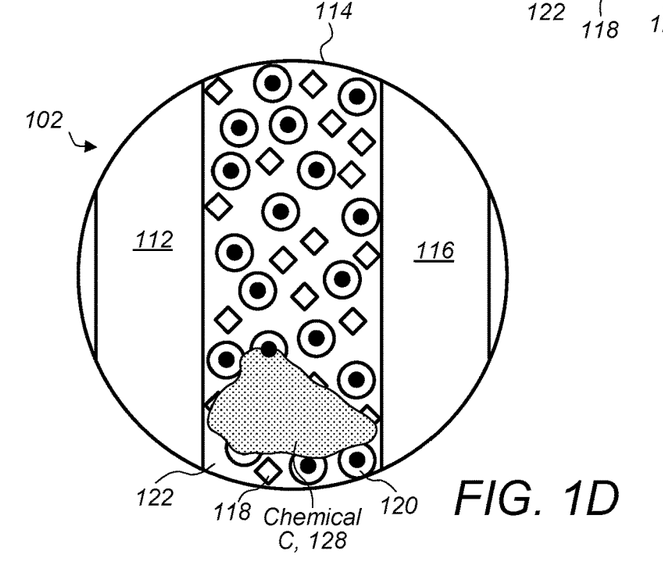
FIG. 1D illustrates two chemicals of an anti-tamper layer mixing in response to a breach of an anti-tamper casing and causing a chain reaction within the anti-tamper layer of the anti-tamper casing, according to some embodiments.

FIG. 1D illustrates two chemicals of an anti-tamper layer mixing in reaction to a breach of an anti-tamper casing and causing a chain reaction within the anti-tamper layer of the anti-tamper casing, according to some embodiments.

In some embodiments, chemical A 124 and chemical B 126 may mix, in response to a breach, to form chemical C 128. As shown in FIG. 1D, chemical C 128 may react with or otherwise disturb polymer matrix 122. Thus, chemical C 128 may cause identifying elements 122 in polymer matrix 122 to be re-arranged or otherwise obscured. In some embodiments, chemical C 128 may further cause other ones of chemical pockets 120 to be breached, resulting in more of chemical C being formed and further causing additional ones of chemical pockets 120 to be breached. Thus, a breach of one or more chemical pockets 120 may set in motion a chain reaction that causes all or a substantial amount of the chemical pockets of an anti-tamper layer, such as anti-tamper layer 114 to be breached. Furthermore, the reaction of chemical C with polymer matrix 122 may cause a substantial amount of identifying elements 118 embedded in polymer matrix 122 to be re-arranged, obscured, or otherwise altered. Thus, a breach of just one chemical pocket may lead to an easily recognizable indication of a breach of the data transfer device 100.

Figure 2:
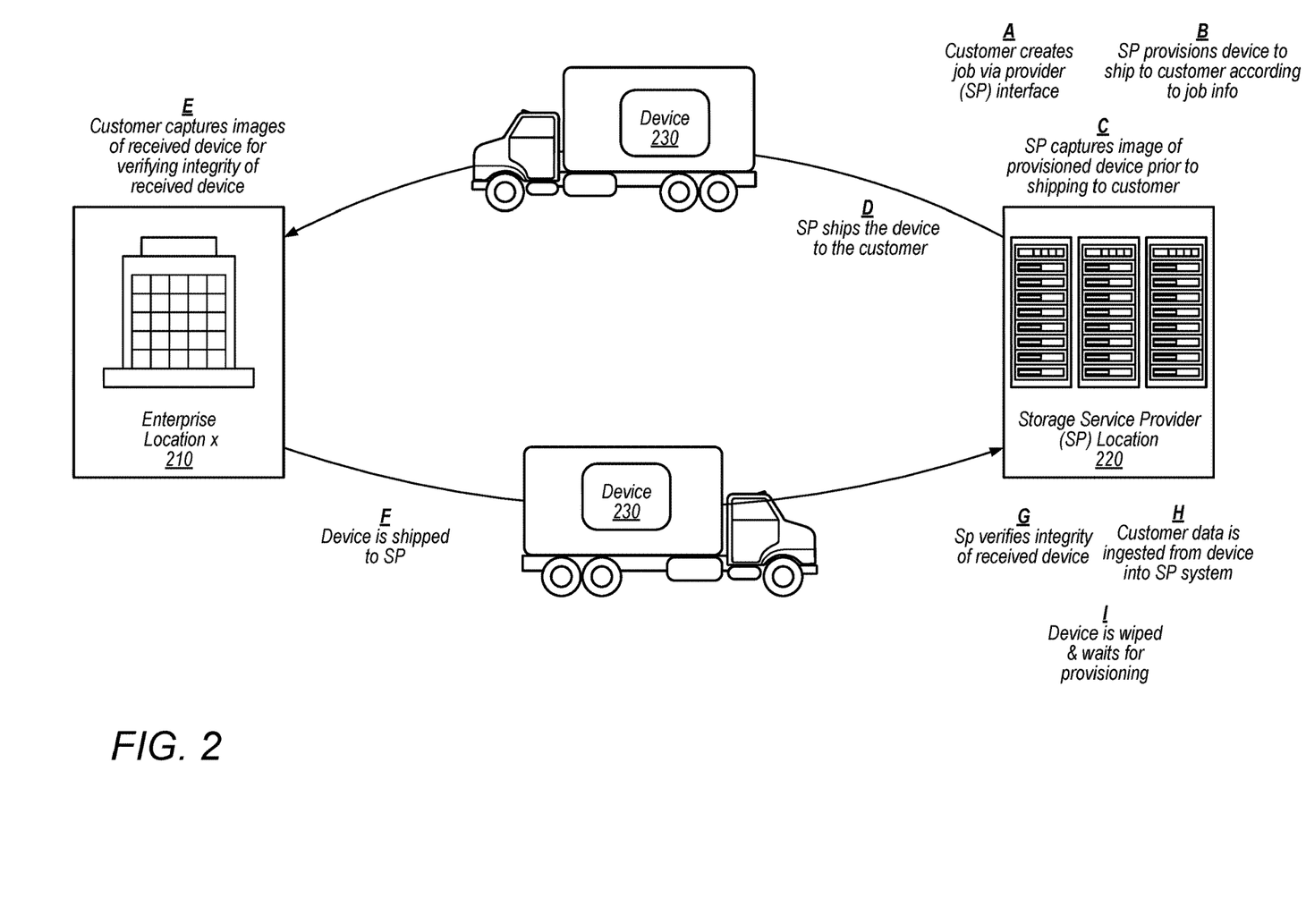
FIG. 2 illustrates a system and process for using a data transfer device with an anti-tamper casing, according to some embodiments.

FIG. 2 illustrates a system and process for using a data transfer device with an anti-tamper casing, according to some embodiments.

The illustrated embodiment depicts movement of a shippable data transfer device with an anti-tamper casing from a service provider location 220 to an enterprise location X 210 and back to the service provider location 220 as well as various processes A-I that are performed along the way by various entities. The data transfer device 100 depicted in FIG. 1 may be the same as the device 230 depicted in FIG. 2, in some embodiments.

Enterprise location X 210 is depicted in FIG. 2. But in some embodiments, the enterprise may have other locations and the shippable data transfer device 230 may be shipped to those locations instead of, in addition to, before, or after the depicted shipment to enterprise location X 210 at (D). In some embodiments, multiple different devices may be shipped to various locations at the same time as the depicted shipment. Shippable data transfer devices with anti-tamper casings may be shipped to entities other than enterprises, for example but not limited to, customers, government entities, other service providers or the like.

In the depicted embodiment, at (A) a customer creates, generates or requests that a job be performed. The job creation or request may be performed via a console such as a network-based page or site of the service provider that the enterprise accesses via one or more networks. At (B) the service provider provisions a particular shippable solid-state electronics device 230, instructs the device to display an address associated with enterprise location X 210 (e.g., obtained during job creation (A)). At (C) prior to relinquishing control of the shippable data transfer device, the service provider captures one or more images of the "signature" of the identifying elements included in the anti-tamper layer of the anti-tamper casing of the device 230. At (D) the service provider ships the device to the requesting customer according to job information (e.g., job information may be determined during generation of the job at request time, in some embodiments). At (E), the device is received at the enterprise location X 210, the customer captures one or more images of the "signature" of the identifying elements of the anti-tamper layer of the anti-tamper casing of the device and sends the images to the service provider for verification of the integrity, identity and/or authenticity of the data transfer device. The service provider may compare the images to the images captured at (C) to determine whether the data transfer device has been tampered with in transit. If the device integrity, identity and/or authenticity is verified, the customer may transfer customer data to the device at the customer site, if the device integrity, identity and/or authenticity cannot be verified, the customer may be alerted and warned to not transfer customer data to the device. At (F) the electronic display is updated with a new destination for the device and the device is shipped back to the service provider or another destination. For example, the service provider may send an updated address or the device may recognize it is at the enterprise location and automatically update the displayed destination address from a memory store programmed with the next destination during the provisioning step (B). At (G) the device is received back at the service provider, and the integrity, identity and/or authenticity of the device is verified in a similar manner as described above, such as comparing captured images of the identifying elements "signature" to previously captured images. At (H) the device is connected to a service provider network, and customer data is ingested from the device into the service provider system. At (I) the device is wiped and is stored until it is provisioned for another job.

The device may be instructed to display various addresses at various times, for example in either the export or import embodiments. It is contemplated that the various addresses may be stored on the device at once, such as when the device is provisioned, for example, or the various addresses may be sent to the device over a network, such as a cellular network or via a customer or provider network or combination thereof. In embodiments, the device may include logic configured to update the displayed address based on the device sensing a geographical position or location of the device. For instance, a device that determines (e.g., based on a GPS sensor or cellular triangulation) that it has arrived at one location, may be configured to display the next address stored in memory of the device.

In some embodiments, images of the "signature" of the identifying elements of the anti-tamper layer of the anti-tamper casing of the data transfer device may be captured at some or all destinations for the data transfer device and compared to previously captured images to verify the integrity, identity and/or authenticity of the data transfer device.

Figure 3:
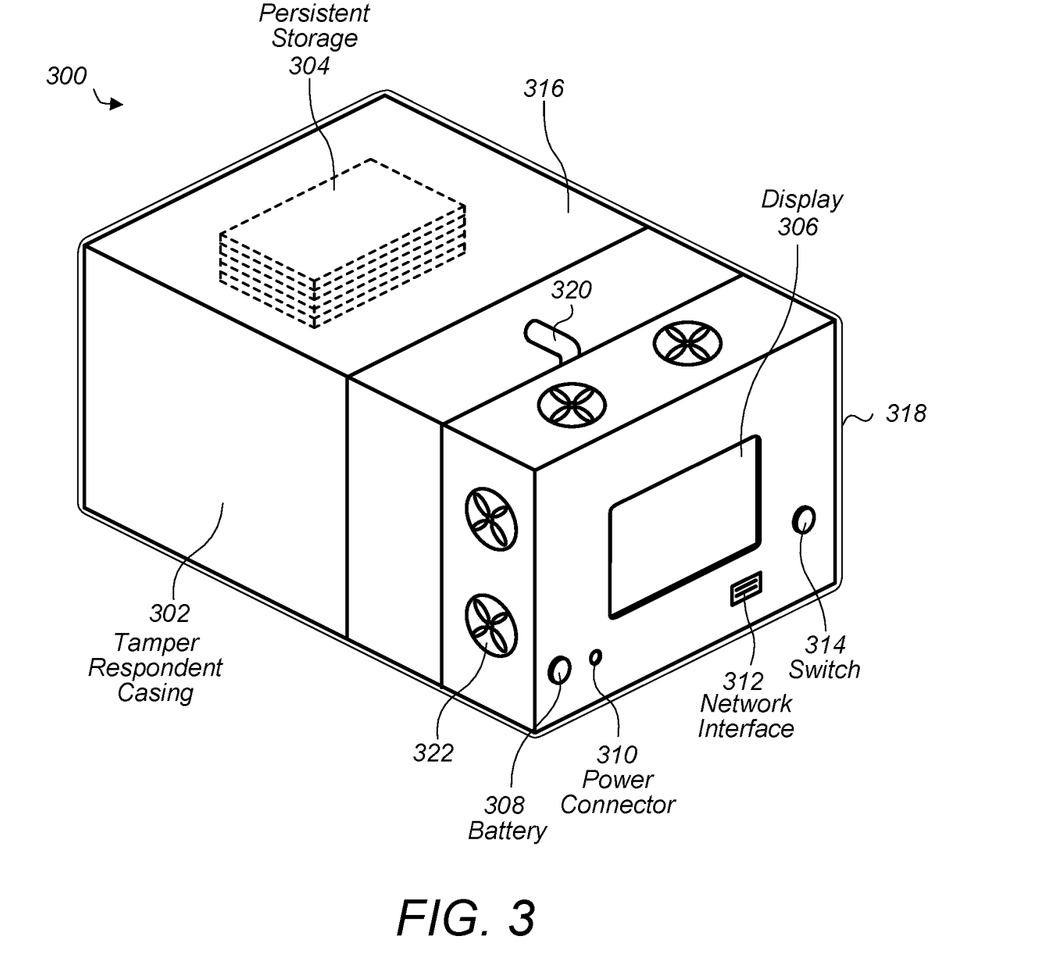
FIG. 3 illustrates a data transfer device with an anti-tamper casing, according to some embodiments.

FIG. 3 illustrates a data transfer device with an anti-tamper casing, according to some embodiments.

The depicted shippable storage device 300 may be used to move customer data off of customer storage networks or servers to other storage networks or servers. Embodiments of the shippable storage device that includes an anti-tamper casing may include more, less, or different features or components than those depicted, in some embodiments.

Data transfer device 300 includes an anti-tamper casing 302 surrounding solid-state electronics 304. In some embodiments, data transfer device 300 may be a similar data transfer device as data transfer device 100 described in regard to FIG. 1. Also, in some embodiments, anti-tamper casing 302 may be an anti-tamper casing such as anti-tamper casing 102 described in regard to FIG. 1 or may be an anti-tamper casing that includes an anti-tamper layer such as the anti-tamper layers described in FIGS. 4-8. The solid-state electronics may include any type of non-volatile storage such as, but not limited to, solid-state disk drives, persistent non-volatile RAM or solid state flash memory devices. The casing may be ruggedized (e.g., according to various standards, such as military standards or electronics industry standards) and may be configured with an outward-facing electronic display 306 such that when enclosed by the enclosure, the solid-state electronics, the enclosure, and the electronic display form a self-contained shipping container suitable for shipping without any additional packaging, labeling or the like and such that the electronic display 306 acts as to display a destination location (e.g., in lieu of a shipping label). In some embodiments, the anti-tamper casing 302 and the display 306 act as reusable shipping components in lieu of cardboard boxes and shipping labels. The enclosure may include various mechanisms to facilitate movement of the data transfer device 300, such as rollers, handles or the like.

Device 300 is illustrated with battery 308 and power connection 310 for powering some or all of the components of the shippable data transfer device that require power to function.

Device 300 is depicted with display 306. The display may incorporate any of various display technologies, such as low-power electronic-ink (E-ink), organic light emitting diodes (OLED), active-matrix organic light-emitting diode (AMOLED), flexible displays or touch-sensitive displays as non-limiting examples. Low-power e-ink displays may provide the benefit of reduced power consumption for a shipping environment where small batteries (e.g., batteries that cost less to ship, are less expensive or take up less shipping space) are preferred. The device 300 may be configured with multiple displays 306, in some embodiments.

Device 300 is illustrated with network interface 312. The network interface 312 may act as interface between the shippable data transfer device 300 and various networks, such as LANS, WANS or the like (e.g., via various protocols, such as iSCSI or Ethernet). In some embodiments, network connection 312 may act as an interface directly to another device (e.g., via SCSI).

Device 300 is illustrated with switch 314. The switch 314 may act as an on-off power switch or as a switch to activate the display, in some embodiments.

Device 300 may be configured with multiple layers of security. For example, data stored on the device may be encrypted one or more times, with one or more keys. The keys may be determined, stored, controlled or held by various parties and applied at various steps of the illustrated processes. For example, some keys used to encrypt the data stored on the device may be stored separate from the device, while other envelope encryption keys used to unwrap data encryption keys on the device may be stored with the device. The encryption keys may be applied in multiple layers, in embodiments.

Device 300 may be configured as one or more other types of network-based device or other electronic devices, such as transient local hardware for example. In an example, non-exhaustive list, device 300 may be configured as various combinations of cryptographic hardware and software (e.g., as a hardware security module cryptographic device), as a storage gateway, as a web service, a firewall, a high-assurance guard, a server, virtual machine image, one or more dongles, a data warehousing solution or database service box, or the like.

In some embodiments, a data transfer device, such as device 300, may include two separate chambers, such as solid-state electronics chamber 316 and auxiliary chamber 318. In some embodiments, solid-state electronics chamber 316 may be surrounded by anti-tamper casing 302, but auxiliary chamber 318 may be outside of anti-tamper casing 302 separated by a gap to allow observation of all six sides and may be connected to the solid-state electronics chamber via a hardened conduit, such as conduit 320. In some embodiments, an auxiliary chamber, such as auxiliary chamber 318, may include a shipping label display, such as display 306, a cooling system, such as cooling system 322, a power supply, such as battery 308 and power connector 310. Also, in some embodiments, an auxiliary chamber, such as auxiliary chamber 318 may include one or more interfaces, such as network interface 312. In some embodiments, an auxiliary chamber may comprise components that require some amount of access and may remove those components from a solid-state electronics chamber, such as solid-state electronics chamber 316, so that once persistent solid-state electronics devices, such as persistent solid-state electronics devices 304, are sealed within the anti-tamper casing of the solid-state electronics chamber, such as anti-tamper casing 302 of solid-state electronics chamber 316, there is little or no need to access the solid-state electronics devices. For example, accessing the solid-state electronics devices may require the anti-tamper casing to be breached and therefore replaced for subsequent remanufactured use.

In some embodiments, an anti-tamper layer of an anti-tamper casing may be configured in various manners. For example FIGS. 5-8 illustrate various arrangements of an anti-tamper layer that may be used in an anti-tamper casing such as anti-tamper casing 302 or anti-tamper casing 102 described above.

FIGS. 4A-4D illustrate a pocket of an anti-tamper layer being breached and reacting to the breach, according to some embodiments.

In some embodiments, multiple capsules of encapsulated chemicals may be included in a same pocket of a polymer matrix of an anti-tamper layer. For example, polymer matrix 402 includes compound A 404 and compound B 406 in pocket 408. In some embodiments, encapsulated chemicals such as compounds A 404 and B 406 may be included in a packet adjacently as shown in FIG. 4A or may be included in a pocket one inside of the other as shown in FIG. 1C.

Figure 4B:
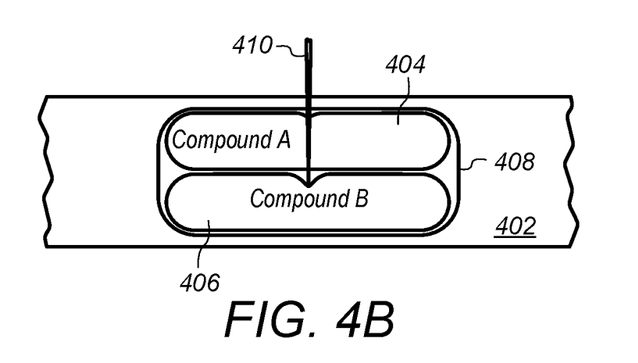
Figure 4C:
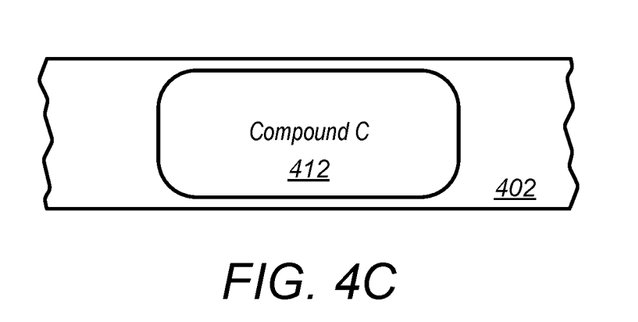
Figure 4D:
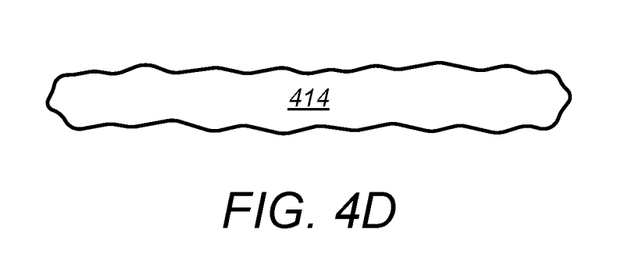
Figure 5A:
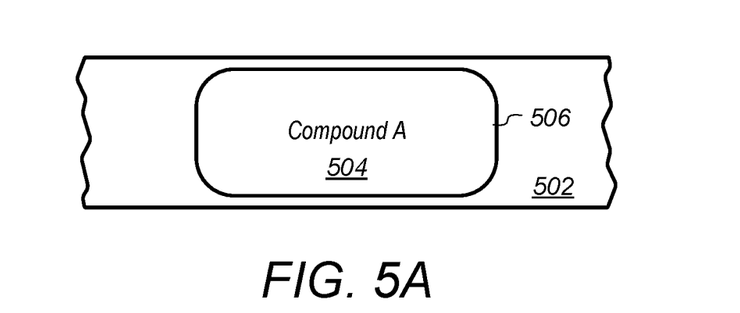
FIGS. 5A-5B illustrate another example of a pocket of an anti-tamper layer being breached and reacting to the breach, according to some embodiments.
Figure 5B:
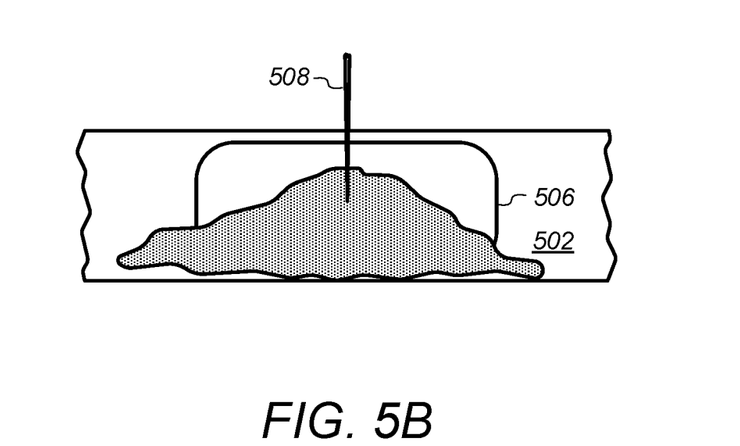

As shown in FIG. 4B a breach of the anti-tamper layer may cause the capsules that comprise compounds A 404 and B 406 to be breached. For example, a nail, drill, sharp blade cutting instrument, laser cutting device, high pressure micro-cutting device, abrasives, chemicals, or other tools may breach the anti-tamper layer of an anti-tamper casing. FIG. 4B shows a drill bit 410 breaching pocket 408. As shown in FIG. 4C, compounds A 404 and B 406 may mix and react to form compound C 412. In some embodiments, compound C 412 may be reactive with polymer matrix 402 and cause the polymer matrix to be altered as shown by altered polymer matrix 414 illustrated in FIG. 4D.

In some embodiments, compounds A and B may be a polyol and an isocyanate or polyacid. The polyol and the isocyanate may react to form a polyurethane foam if mixed, wherein the polyurethane foam obscures or re-arranges the identifying elements in the polymer matrix of the anti-tamper layer. In some embodiments, compound A may be sodium acetate and compound B may be water, wherein the sodium acetate and the water have an exothermal reaction when combined, wherein the heat generated from the reaction melts or dissolves the polymer matrix of the anti-tamper layer. Thus causing the identifying elements in the polymer matrix to be re-arranged. In some embodiments, compound A may be an isocyanate and compound B may be water wherein the isocyanate and water react to form a foam when combined, wherein the foam obscures or re-arranges the identifying elements in the polymer matrix.

FIGS. 5A-5B illustrate another example of a pocket of an anti-tamper layer being breached and reacting to the breach, according to some embodiments.

In some embodiments, a pocket of an anti-tamper layer may comprise a single compound. For example pocket 506 of polymer matrix 502 includes compound 504. In some embodiments compound 504 may be a dye, solvent, acid, or other reactive material that reacts with polymer matrix 502 if a capsule of pocket 506 is breached. In the case of a dye, the dye may obscure or otherwise alter a pattern of identifying elements included in the polymer matrix. For example, FIG. 5B illustrates drill bit 508 breaching pocket 506 causing compound 504 to be released into polymer matrix 502.

Figure 6:
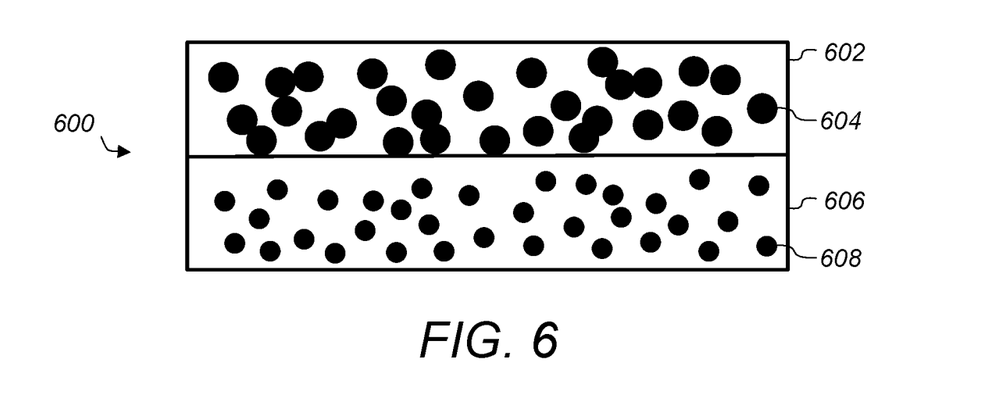
FIG. 6 illustrates a multi-part anti-tamper layer, according to some embodiments.

FIG. 6 illustrates a multi-part anti-tamper layer, according to some embodiments.

In some embodiments, identifying elements and chemical pockets may be included in a same polymer matrix as illustrated in FIG. 1. Or, in other embodiments, chemical pockets may be included in a first layer of an anti-tamper layer and identifying elements may be included in another layer of an anti-tamper layer. For example, anti-tamper layer 600 includes layers 602 and 606. Layer 602 incudes chemical pockets 604 in a polymer matrix of layer 602 and layer 606 includes identifying elements 608 in a polymer matrix of layer 606. In some embodiments, layers 602 and 606 may be made of different types of polymer. In some embodiments, identifying elements, such as identifying elements 608, may be reflective particles, colored particles, or colored patches.

Figure 7:
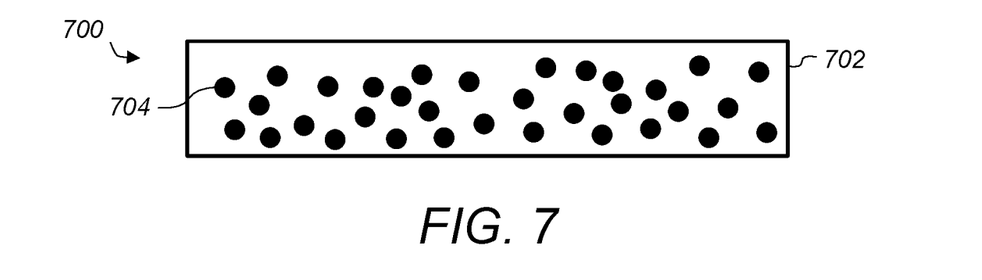
FIG. 7 illustrates another example anti-tamper layer, according to some embodiments.

FIG. 7 illustrates another example anti-tamper layer, according to some embodiments. In some embodiments, an anti-tamper layer 700 may include a layer of identifying elements suspended in an electrical field. For example, layer 702 includes suspended identifying elements 704 suspended in layer 702. In some embodiments, entry of a foreign object, such as a drill bit, may disrupt the electrical field and cause the identifying elements 704 to be re-arranged. For example, in some embodiments, identifying elements may be charged particles suspended in the matrix in response to a particular voltage differential across the matrix. A breach of an anti-tamper casing may alter the voltage differential across the matrix causing the charged particles to be re-arranged. In some embodiments, an anti-tamper layer 700 may be included in an anti-tamper casing in addition to or in place of any of the other layers described herein.

Figure 8:
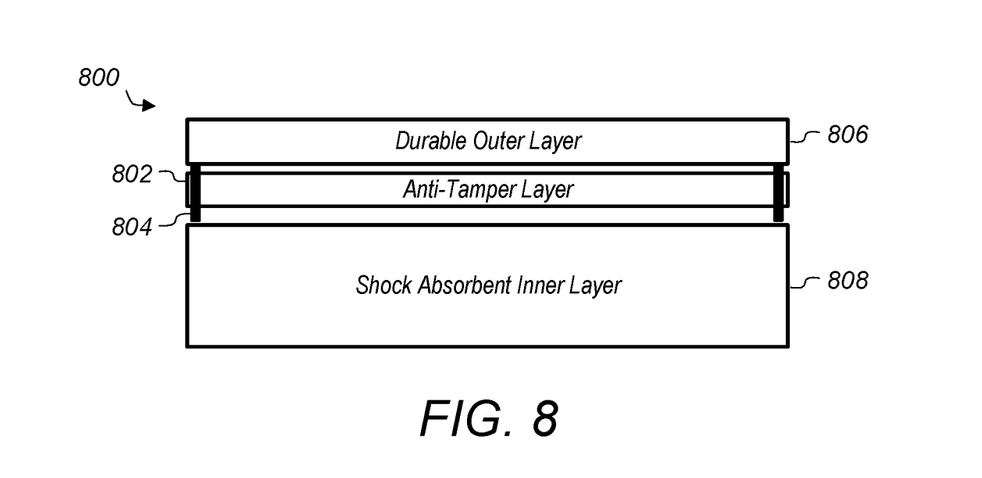
FIG. 8 illustrates another example anti-tamper layer, according to some embodiments.

FIG. 8 illustrates another example anti-tamper layer, according to some embodiments. In some embodiments, identifying elements may be included in a polymer material that is tension, wherein a foreign object, such as a drill bit, puncturing the layer causes the identifying elements included in the polymer material under tension to be re-arranged. For example, anti-tamper casing 800 includes a tensioned anti-tamper layer 802 stretched between two supports 804. In some embodiments, supports 804 may be coupled to a durable outer layer 806 and a shock-absorbent layer 808. In some embodiments, an anti-tamper layer 802 may be included in an anti-tamper casing in addition to or in place of any of the other layers described herein.

Figure 9:
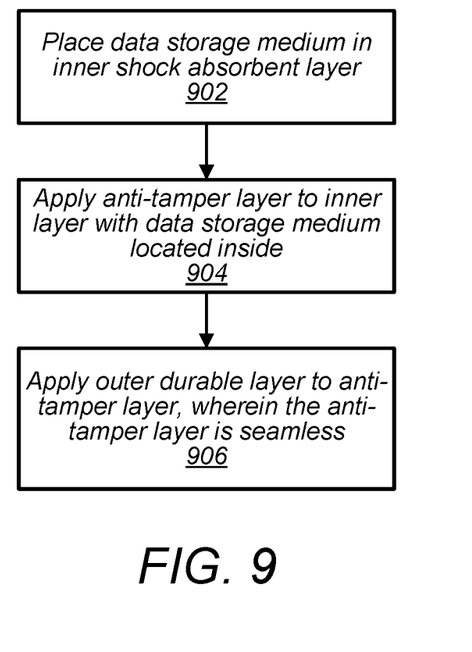
FIG. 9 illustrates a flow diagram of a process of producing a shippable data transfer device with an anti-tamper casing, according to some embodiments.

FIG. 9 illustrates a flow diagram of a process of producing a shippable data transfer device with an anti-tamper casing, according to some embodiments.

At 902 the solid-state electronics medium of the shippable data transfer device is placed in an enclosure and surrounded at least in part by an inner-shock absorbent layer. In some embodiments, the inner shock-absorbent layer may make up a structure of the enclosure that contains the solid-state electronics medium or may surround another structure that makes up the enclosure that surrounds the solid-state electronics medium.

At 904 an anti-tamper layer, such as any of the anti-tamper layers described herein, is applied to the inner layer of the casing with the solid-state electronics medium located inside the enclosure. Since the solid-state electronics medium is already located inside the enclosure, the anti-tamper layer may be applied completely around the enclosure without any seams.

At 906, the outer durable layer is applied to the anti-tamper layer.

Figure 10:
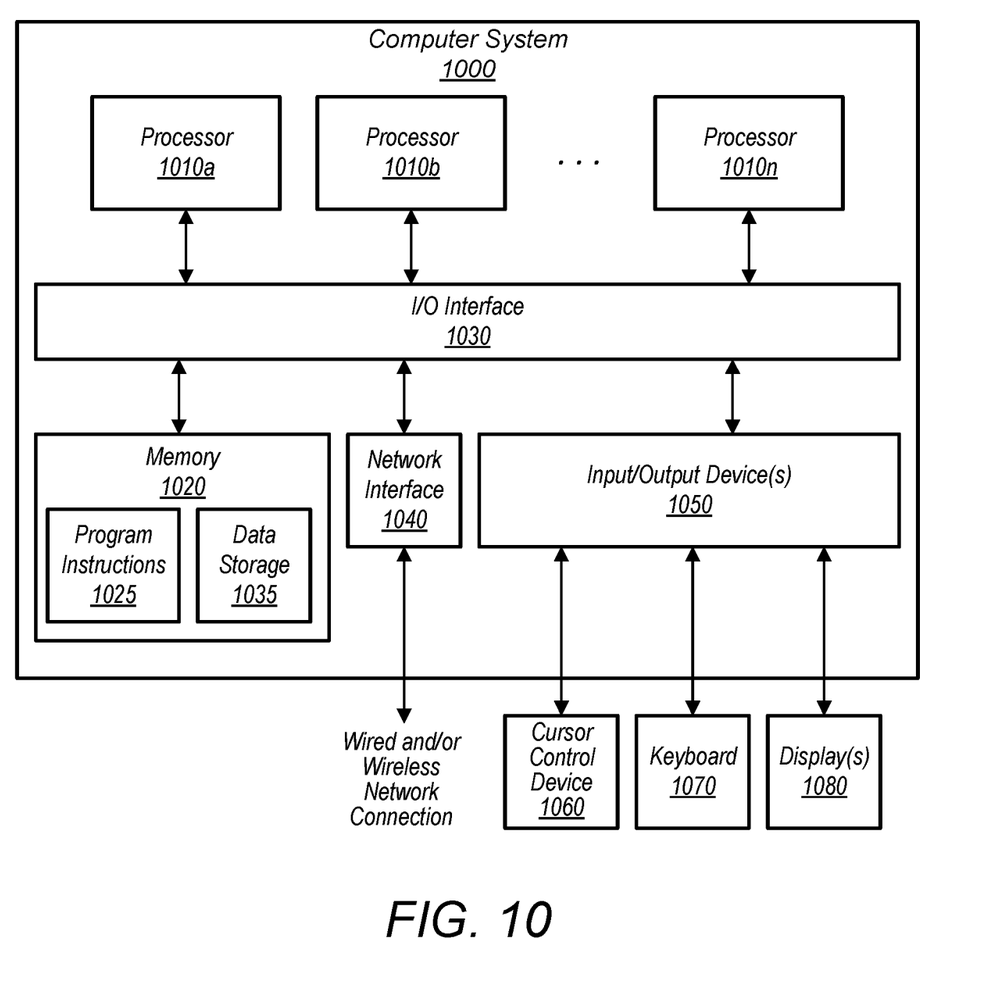
FIG. 10 is a block diagram illustrating an example computer system that implements some or all of the techniques described herein, according to different embodiments.

FIG. 10 is a block diagram illustrating an example computer system that implements some or all of the techniques described herein, according to different embodiments.

Any of various computer systems may be configured to implement the processes associated (e.g., provisioning or ingestion by the service provider or solid-state electronics by the portable data transfer device) with a shippable solid-state electronics device. For example, FIG. 10 is a block diagram illustrating one embodiment of a computer system suitable for implementing some of the systems and methods described herein. In various embodiments, the storage service of the service provider at the storage service location 220, or customer computers at enterprise location 210 (e.g., customer server) may each include a computer system 1000 such as that illustrated in FIG. 10.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable application, while in other embodiments servers may include more, fewer, or different elements than computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the service provider or downloadable proprietary software are shown stored within system memory 1020 as program instructions 1025. In some embodiments, system memory 1020 may include data 1035 which may be configured as described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In particular, network interface 1040 may be configured to allow communication between computer system 1000 and/or various I/O devices 1050. I/O devices 1050 may include scanning devices, display devices, input devices and/or other communication devices, as described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In some embodiments, I/O devices 1050 may be relatively simple or "thin" client devices. For example, I/O devices 1050 may be configured as dumb terminals with display, data entry and communications capabilities, but otherwise little computational functionality. However, in some embodiments, I/O devices 1050 may be computer systems configured similarly to computer system 1000, including one or more processors 1010 and various other devices (though in some embodiments, a computer system 1000 implementing an I/O device 1050 may have somewhat different devices, or different classes of devices).

In various embodiments, I/O devices 1050 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1050 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with a data transfer device. In general, an I/O device 1050 (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the enterprise logic, packing service, product database, device and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A data transfer device comprising:
   a persistent solid-state electronics medium; and
   an anti-tamper case enclosing the persistent solid-state electronics medium, wherein the anti-tamper case comprises:
      a durable outer layer;
      a shock absorbent inner layer; and
      an anti-tamper layer positioned between the durable outer layer and the shock absorbent inner layer, wherein the anti-tamper layer comprises:
         a plurality of identifying elements arranged in a unique pattern in a polymer matrix of the anti-tamper layer, wherein the unique pattern is arranged such that the unique pattern can be captured in an image and compared to a subsequently captured image to determine if the unique pattern has been altered; and
         one or more substances encapsulated in pockets of the polymer matrix of the anti-tamper layer, wherein the one or more substances are configured to actively re-arrange or obscure the plurality of identifying elements such that the unique pattern is altered in response to a breach of the anti-tamper case penetrating beyond the durable outer layer.

2. The data transfer device of claim 1, wherein the one or more substances encapsulated in the pockets of the polymer matrix of the anti-tamper layer comprise:
   a first chemical encapsulated in a first set of capsules; and
   a second chemical encapsulated in a second set of capsules,
   wherein the first set of capsules and the second set of capsules are arranged in the polymer matrix such that the breach of the anti-tamper case penetrating beyond the durable outer layer causes at least one capsule of the first set of capsules and at least one capsule of the second set of capsules to rupture and mix the first chemical and the second chemical,
   wherein the first chemical and the second chemical, when mixed, react to form a third chemical that alters the polymer matrix further causing other ones of the first set of capsules and the second set of capsules to rupture and mix the first chemicals and the second chemicals encapsulated in the other ones of the first and second set of capsules.

3. The data transfer device of claim 1, wherein the one or more substances encapsulated in the pockets of the polymer matrix of the anti-tamper layer comprise:
   a dye separated from the polymer matrix by linings of the pockets, wherein the dye is soluble in the polymer matrix when a lining of one of the pockets is breached;
   a solvent separated from the polymer matrix by linings of the pockets, wherein the solvent causes the polymer matrix to dissolve when a lining of one of the pockets is breached; or
   a reactive material separated from the polymer matrix by linings of the pockets, wherein the reactive material causes the polymer matrix to be altered when a lining of one of the pockets is breached.

4. The data transfer device of claim 1, wherein the anti-tamper layer is fabricated around the shock absorbent inner layer with the persistent solid-state electronics medium installed in the shock absorbent inner layer such that the anti-tamper layer forms a seamless layer around the inner shock absorbent layer.

5. The data transfer device of claim 1, wherein the persistent solid-state electronics medium and the anti-tamper case form a first chamber of the data transfer device, and wherein the data transfer device further comprises:
   an additional chamber comprising a power supply, a heat transfer device, or one or more connection interfaces.

6. The data transfer device of claim 5, wherein the additional chamber is connected to the first chamber via a conduit comprising one or more wires and one or more heat pipes,
   wherein the conduit comprises one or more lateral shifts between the first chamber and the second chamber such that the conduit does not form a direct path through the anti-tamper layer.

7. An anti-tamper casing for electronic devices comprising:
   an outer layer;
   an inner layer; and
   an anti-tamper layer positioned between the outer layer and the inner layer, wherein the anti-tamper layer comprises:
   a plurality of identifying elements arranged in a pattern in a matrix of the anti-tamper layer, wherein the pattern is arranged such that the pattern can be captured in an image and compared to a subsequently captured image to determine if the pattern has been altered, and
   one or more substances encapsulated in the matrix of the anti-tamper layer, wherein the one or more substances are is configured to actively re-arrange or obscure the plurality of identifying elements such that the pattern is altered in response to a breach of the anti-tamper casing.

8. The anti-tamper casing of claim 7, wherein the outer layer is made of a transparent material such that the plurality of identifying elements arranged in the unique pattern in the matrix of the anti-tamper layer are visible when viewed through the outer layer.

9. The anti-tamper casing of claim 7, wherein the one or more substances encapsulated in the matrix of the anti-tamper layer further comprises:
    a first chemical encapsulated in the matrix of the anti-tamper layer; and
    a second chemical encapsulated in the matrix of the anti-tamper layer, wherein the first and second chemical are encapsulated in the matrix of the anti-tamper layer such that the breach of the anti-tamper casing causes the first chemical and the second chemical to mix,
    wherein the first chemical and the second chemical, when mixed, react to form a third chemical that alters the matrix of the anti-tamper layer.

10. The anti-tamper casing of claim 9, wherein:
    the first chemical is a polyol compound; and
    the second chemical is an isocyanate compound or a polyacid compound.

11. The anti-tamper casing of claim 9, wherein the anti-tamper layer is contained between the outer layer and the inner layer such that the third chemical is contained within the anti-tamper casing.

12. The anti-tamper casing of claim 9, wherein:
    the first chemical is encapsulated in a first set of capsules;
    the second chemical is encapsulated in a second set of capsules; and
    wherein respective ones of the first set of capsules are included in respective ones of the second set of capsules, and wherein respective ones of the second set of capsules are included in pockets of the matrix.

13. The anti-tamper casing of claim 7, wherein the anti-tamper layer further comprises:
    a compound encapsulated in multiple pockets of the matrix of the anti-tamper layer, wherein the breach of the anti-tamper casing causes the compound to be released from one or more breached pockets in the matrix, wherein the compound when released irreversibly alters the structure or appearance of the anti-tamper layer.

14. The anti-tamper casing of claim 13, wherein the compound is:
    a dye separated from the polymer matrix by capsules of the pockets, wherein the dye is soluble in the polymer matrix when a capsule of one of the pockets is breached;
    a solvent separated from the polymer matrix by capsules of the pockets, wherein the solvent causes the polymer matrix to dissolve when a capsule of one of the pockets is breached; or
    a reactive material separated from the polymer matrix by capsules of the pockets, wherein the reactive material causes the polymer matrix to be altered when a capsule of one of the pockets is breached.

15. The anti-tamper casing of claim 7, wherein:
    the plurality of identifying elements are charged particles suspended in the matrix in response to a particular voltage differential across the matrix,
    wherein a breach of the anti-tamper casing alters the voltage differential across the matrix causing the charged particles to be re-arranged.

16. The anti-tamper casing of claim 7, wherein the plurality of identifying elements are particles visible when illuminated by visible light.

17. The anti-tamper casing of claim 7, wherein the plurality of identifying elements are particles identifiable:
    when illuminated by ultraviolet light;
    according to magnetic properties of the identifying elements; or
    according to radioactive properties of the identifying elements.

18. An anti-tamper layer for an anti-tamper casing comprising:
    a plurality of identifying elements arranged in a pattern in a polymer matrix of the anti-tamper layer, wherein the pattern is arranged such that the pattern can be captured in an image and compared to a subsequently captured image to determine if the pattern has been altered; and
    one or more substances encapsulated in pockets of the polymer matrix of the anti-tamper layer, wherein the one or more substances are configured to actively re-arrange or obscure the plurality of identifying elements such that the pattern is altered in response to a breach of the anti-tamper layer, and wherein an outer portion of the anti-tamper layer is made of a transparent material such that the plurality of identifying elements arranged in the pattern in the polymer matrix of the anti-tamper layer are visible when viewed through the outer portion.

19. The anti-tamper layer of claim 18, wherein the plurality of identifying elements comprise reflective particles, colored particles, or colored patches.

20. The anti-tamper layer of claim 18, wherein the one or more substances encapsulated in the pockets of the polymer matrix of the anti-tamper layer comprise:
    a first chemical encapsulated in a first set of capsules in the polymer matrix; and
    a second chemical encapsulated in a second set of capsules in the polymer matrix,
    wherein the first set of capsules and the second set of capsules are arranged in the polymer matrix such that the breach of the anti-tamper layer causes at least one capsule of the first set of capsules and at least one capsule of the second set of capsules to rupture and mix the first chemical and the second chemical,
    wherein the first chemical and the second chemical, when mixed, react to form a third chemical that alters the polymer matrix further causing other ones of the first set of capsules and the second set of capsules to rupture and mix the first chemicals and the second chemicals encapsulated in the other ones of the first and second set of capsules.

* * * * *